United States Patent
Yokozawa et al.

(10) Patent No.: US 7,999,058 B2
(45) Date of Patent: Aug. 16, 2011

(54) METHOD FOR PRODUCING AROMATIC POLYMER

(75) Inventors: Tsutomu Yokozawa, Kanagawa (JP); Hideyuki Higashimura, Ibaraki (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 155 days.

(21) Appl. No.: 12/278,879

(22) PCT Filed: Feb. 13, 2007

(86) PCT No.: PCT/JP2007/052907
§ 371 (c)(1),
(2), (4) Date: Aug. 8, 2008

(87) PCT Pub. No.: WO2007/094487
PCT Pub. Date: Aug. 23, 2007

(65) Prior Publication Data
US 2010/0168369 A1   Jul. 1, 2010

(30) Foreign Application Priority Data

Feb. 14, 2006  (JP) .................. 2006-036163

(51) Int. Cl.
*C08G 64/00* (2006.01)
*C08G 63/02* (2006.01)

(52) U.S. Cl. ........ 528/211; 528/176; 528/219; 528/271; 528/272

(58) Field of Classification Search .................. 528/176, 528/219, 271, 272
See application file for complete search history.

(56) References Cited

U.S. PATENT DOCUMENTS

| | | | |
|---|---|---|---|
| 2002/0173566 A1 * | 11/2002 | Haese et al. ................. | 524/117 |
| 2003/0122479 A1 | 7/2003 | Farrand et al. | |
| 2010/0144999 A1 | 6/2010 | Yokozawa et al. | |

FOREIGN PATENT DOCUMENTS

| | | |
|---|---|---|
| JP | 52-154900 A | 12/1977 |
| JP | 11-080346 A | 3/1999 |
| JP | 2003-261481 A | 9/2003 |
| JP | 2004-204043 A | 7/2004 |
| JP | 2005-60602 A1 | 3/2005 |
| JP | 2006-225461 A | 8/2006 |
| JP | 2006-307086 A | 11/2006 |
| WO | 2006/088217 A1 | 8/2006 |

OTHER PUBLICATIONS

J. Hassan et al., "Aryl-Aryl Bond Formation One Century after the Discovery of the Ullmann Reaction," Chem. Rev., vol. 102, 2002, pp. 1359-1469.
R. Miyakoshi et al., "Catalyst-Transfer polycondensation for the Synthesis of Poly(p-phenylene) with Controlled Molecular Weight and Low Polydispersity," J. Am. Chem. Soc., vol. 128, 2006, pp. 16012-16013.
Gao Chao, et al., "Research on Third-Order Nonlinear Optical Properties of a Soluble Poly(Paraphenylene) Derivative", Journal of Xi'an Jiaotong University, vol. 39, No. 4, Apr. 2005, English Translation.

* cited by examiner

*Primary Examiner* — Terressa M Boykin
(74) *Attorney, Agent, or Firm* — Sughrue Mion, PLLC

(57) ABSTRACT

A method for producing an aromatic polymer includes polycondensing an aromatic compound represented by formula (I) in the presence of a nickel complex containing a phosphine compound represented by formula (II),

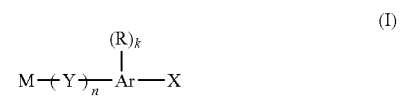

wherein, Ar denotes an aromatic ring containing organic group, which aromatic ring may contain an oxygen atom and/or a nitrogen atom; R denotes a monovalent group containing a hydrocarbon group; k is an integer of 1 or more; X denotes an halogen atom, a nitro group or a group represented by —$SO_3Q$, wherein Q denotes a monovalent hydrocarbon group; Y denotes O, S, an imino group, an ethenylene group, or an ethynylene group; n denotes 0 or 1; and M denotes H, —$B(OQ^1)_2$, —$Si(Q^2)_3$, —$Sn(Q^3)_3$ or —$Z^1(Z^2)m$, wherein $Q^1$ denotes H or a monovalent hydrocarbon group; $Q^2$ and $Q^3$ denote a monovalent hydrocarbon group; $Z^1$ denotes a metal atom or a metal ion; $Z^2$ denotes a counter ion; and m is an integer of 0 or higher;

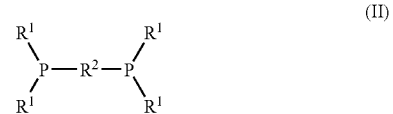

wherein, $R^1$ denotes a monovalent hydrocarbon group, and $R^2$ denotes a divalent hydrocarbon group.

8 Claims, 1 Drawing Sheet

METHOD FOR PRODUCING AROMATIC POLYMER

TECHNICAL FIELD

The present invention relates to a method for producing an aromatic polymer.

BACKGROUND ART

An aromatic polymer has excellent electric property, optical property, heat resistance, mechanical property, and the like. Thus, it is known that the aromatic polymer is useful for function materials in a conductive material, a photoelectric conversion material, a light-emitting material, a nonlinear optical material, a material for cell, an electronic part material, a material for automobiles, and the like.

As for the methods for producing an aromatic polymer, following methods are proposed. That is, a method for polycondensation of an aromatic compound (the non-patent document 1) in which, e.g., a transition metal compound such as copper, palladium, nickel, or the like is used as a catalyst or a reacting reagent, a method for polycondensation (the patent document 1) in which an organic compound having two or more halogens in a molecule reacts with magnesium using a nickel catalyst.

However, these methods cannot obtain an aromatic polymer having a high molecular weight and a narrow molecular weight distribution.

[Patent Document 1] Unexamined Japanese Patent Publication No. 552-154900
[Non-patent Document 1] Chem. Rev. 102, 1359 (2002)

DISCLOSURE OF THE INVENTION

An objective of the present invention is to provide a method for producing an aromatic polymer having a high molecular weight and a narrow molecular weight distribution, and an aromatic polymer produced by this method.

A first aspect of the present invention is the following method for producing an aromatic polymer. That is, the method for polycondensing an aromatic compound represented by the following general formula (I) in the presence of a nickel complex containing a phosphine compound represented by the following general formula (II).

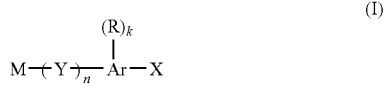

(I)

(wherein Ar denotes a divalent organic group having an aromatic ring which may include an oxygen atom and/or a nitrogen atom. R denotes a monovalent hydrocarbon group which may be substituted, a hydrocarbon oxy group which may be substituted, an amino group which is substituted by two not-substituted or substituted monovalent hydrocarbon groups, a hydrocarbon mercapto group which may be substituted, a hydrocarbon carbonyl group which may be substituted, a hydrocarbon oxycarbonyl group which may be substituted, an amino carbonyl group which is substituted by two not-substituted or substituted monovalent hydrocarbon groups, or a hydrocarbon sulfonyl group which may be substituted. k is an integer of 1 or more. When there are plural R, they may be identical with each other or may be different from each other, and two R together may form a ring. X denotes a halogen atom, a nitro group, or a group represented by $-SO_3Q$ (wherein Q denotes a monovalent hydrocarbon group which may be substituted). Y denotes an oxygen atom, a sulfur atom, an imino group, a substituted imino group, an ethenylene group, a substituted ethenylene group, or an ethynylene group. n denotes 0 or 1. M denotes a hydrogen atom, $-B(OQ^1)_2$, $-Si(Q^2)_3$, $-Sn(Q^3)_3$, or $-Z^1(Z^2)m$, (wherein $Q^1$ denotes a hydrogen atom or a monovalent hydrocarbon group, two $Q^1$ may be identical with each other or may be different from each other, and two $Q^1$ together may form a ring. $Q^2$ denotes a monovalent hydrocarbon group, and three $Q^2$ may be identical with each other or may be different from each other. $Q^3$ denotes a monovalent hydrocarbon group, and three $Q^3$ may be identical with each other or may be different from each other. $Z^1$ denotes a metal atom or a metal ion, $Z^2$ denotes a counter ion, and m is an integer of 0 or higher.))

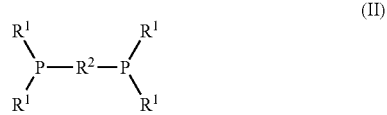

(II)

(wherein $R^1$ denotes a monovalent hydrocarbon group which may be substituted, four $R^1$ may be identical with each other or may be different from each other, and two $R^1$ together may form a ring. $R^2$ denotes a divalent hydrocarbon group which may be substituted.)

A second aspect of the present invention is an aromatic polymer produced by the method of the first aspect.

A third aspect of the present invention is an aromatic polymer having a repeating unit represented by the following general formula (VIII), having a number average molecular weight of not less than 10,000 in terms of polystyrene, and having a molecular weight distribution of 1.0 to 1.3 which is specified by the general formula of (the weight average molecular weight in terms of polystyrene)/(the number average molecular weight in terms of polystyrene).

(VIII)

(wherein Ar* denotes a benzene ring or pyrrole ring. R denotes a monovalent hydrocarbon group which may be substituted, a hydrocarbon oxy group which may be substituted, an amino group which is substituted by two not-substituted or substituted monovalent hydrocarbon groups, a hydrocarbon mercapto group which may be substituted, a hydrocarbon carbonyl group which may be substituted, a hydrocarbon oxycarbonyl group which may be substituted, an amino carbonyl group which is substituted by two not-substituted or substituted monovalent hydrocarbon groups, or a hydrocarbon sulfonyl group which may be substituted. k is an integer of 1 or higher. When there are plural R, they may be identical with each other or may be different from each other, and two R together may form a ring.)

MODE FOR CARRYING OUT THE INVENTION

Method for Producing an Aromatic Polymer

Figure 1:
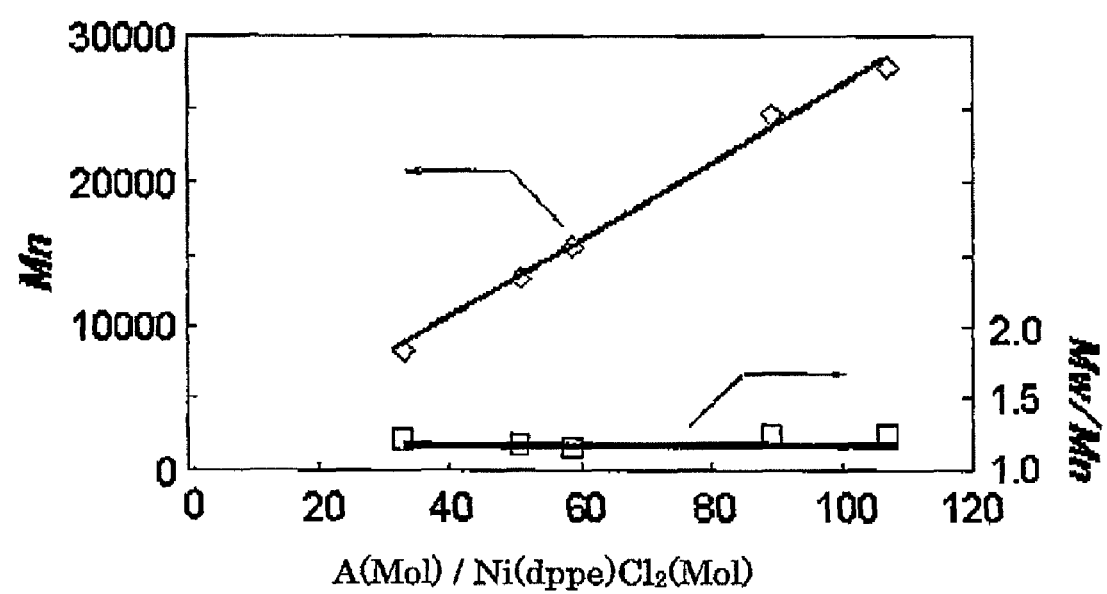
FIG. 1 is a graph illustrated the relationship between "Ratio of Compound A (mol)/Ni(dppe)Cl₂ (mol)", and "Number Average Molecular Weight Mn" and "Molecular Weight Distribution Mw/Mn".

A production method of the present invention includes polycondensing an aromatic compound represented by the above-described general formula (I) in the presence of a nickel complex containing a phosphine compound represented by the above-described general formula (II). In the production method of the present invention, the aromatic compound represented by the above-described general formula (I) and the nickel complex containing a phosphine compound represented by the above-described general formula (II) may be used independently or may be used by mixing two or more.

Aromatic Compounds

Ar in the above described general formula (I) denotes a divalent organic group having an aromatic ring which may include an oxygen atom and/or a nitrogen atom. Removing two hydrogen atoms from the aromatic ring makes the divalent organic group.

The aromatic ring may include an oxygen atom and/or a nitrogen atom (that is, it includes one or more kinds of atom selected from the group consisting of a hydrogen atom, a carbon atom, an oxygen atom, and a nitrogen atom). It is preferable that the aromatic ring includes a hydrogen atom and a carbon atom, includes a hydrogen atom, a carbon atom, and an oxygen atom, includes a hydrogen atom, a carbon atom, and a nitrogen atom, or includes a hydrogen atom, a carbon atom, an oxygen atom, and a nitrogen atom. More preferably, the aromatic ring includes a hydrogen atom and a carbon atom, includes a hydrogen atom, a carbon atom, and an oxygen atom, and includes a hydrogen atom, a carbon atom, and a nitrogen atom. Particular-preferably, the aromatic ring includes a hydrogen atom and a carbon atom, and includes a hydrogen atom, a carbon atom and a nitrogen atom. The aromatic ring has ordinarily the carbon number of 2 to 60. Such aromatic rings are preferably a monocyclic aromatic ring, a condensed-ring aromatic ring, and a polycyclic aromatic ring, more preferably a monocyclic aromatic ring and a condensed-ring aromatic ring, further more preferably a monocyclic aromatic ring, and particular-preferably a benzene ring.

For example, the aromatic ring is a monocyclic aromatic ring such as a benzene ring, a pyridine ring, a 1,2-diazine ring, a 1,3-diazine ring, a 1,4-diazine ring, a 1,3,5-triazine ring, a furan ring, a pyrrole ring, a pyrazole ring, an imidazole ring, an oxazole ring or the like; a condensed-ring aromatic ring obtained by condensing two or more rings independently selected from the monocyclic aromatic rings; a polycyclic aromatic ring obtained by singly bonding two or more rings independently selected from the monocyclic aromatic rings and/or the condensed-ring aromatic rings, or connecting these rings with a methylene group, an ethylene group, an ethenylene group, an ethynylene group, an oxygen atom, an imino group, a carbonyl group or the like. In the condensed-ring aromatic ring, the number of a monocyclic aromatic ring to be condensed is preferably 2 to 4, more preferably 2 to 3, and further more preferably 2. In the polycyclic aromatic ring, the number of a monocyclic aromatic ring and/or a condensed-ring aromatic ring to be connected is preferably 2 to 4, more preferably 2 to 3, and further more preferably 2.

Particular examples of the monocyclic aromatic ring are as follows.

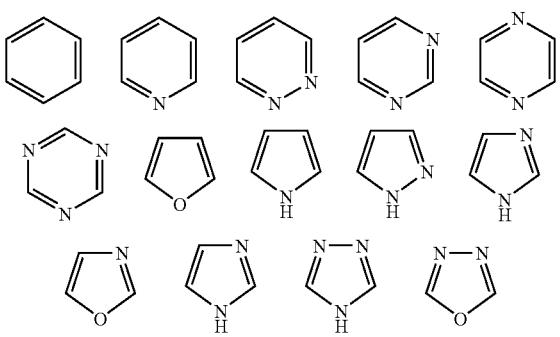

Particular examples of the condensed-ring aromatic ring are as follows.

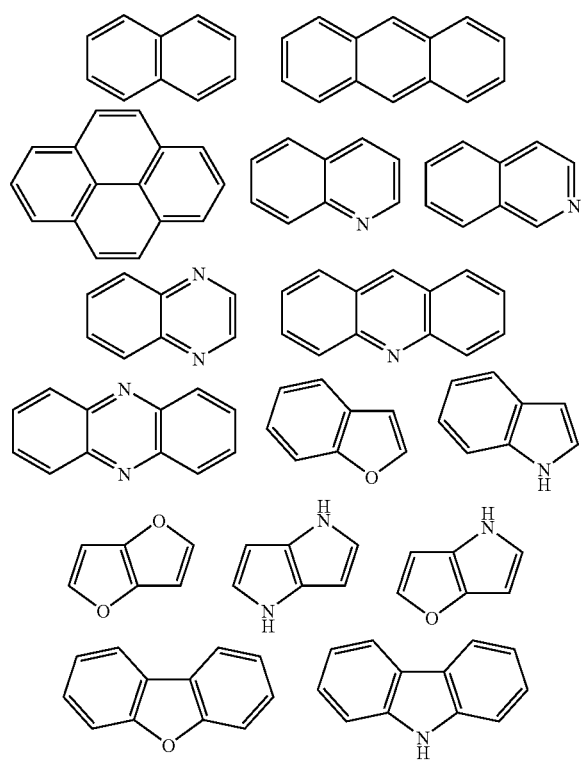

Particular examples of the polycyclic aromatic ring are as follows.

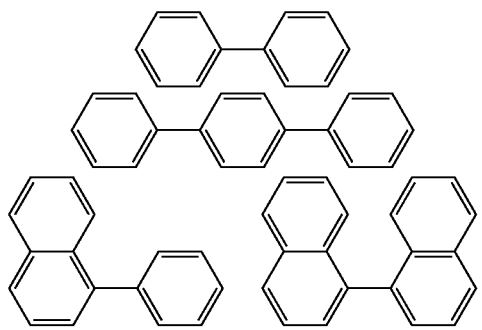

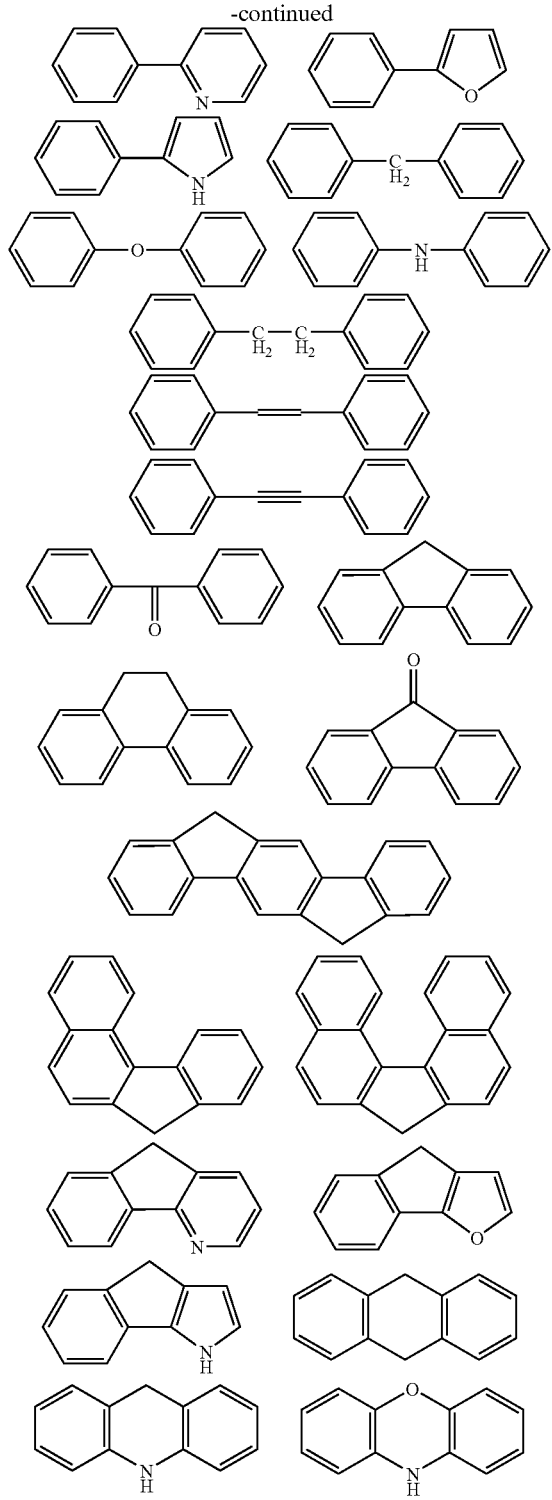

-continued stituted, a hydrocarbon oxy group which may be substituted (a hydrocarbon oxy group which may be substituted), an amino group substituted by two not-substituted or substituted monovalent hydrocarbon groups (that is, a hydrocarbon disubstituted amino group which may be substituted), a hydrocarbon mercapto group which may be substituted (a hydrocarbon mercapto group which may be substituted), a hydrocarbon carbonyl group which may be substituted (a hydrocarbon carbonyl group which may be substituted), a hydrocarbon oxy carbonyl group which may be substituted (a hydrocarbon oxy carbonyl group which may be substituted), an amino carbonyl group substituted by two not-substituted or substituted monovalent hydrocarbon groups (that is, a hydrocarbon disubstituted amino carbonyl group which may be substituted), or a hydrocarbanoxy sulfonyl group which may be substituted (a hydrocarbonoxy sulfonyl group which may be substituted). The monovalent hydrocarbon group which may be substituted, the hydrocarbon oxy group which may be substituted, the amino group substituted by two not-substituted or substituted monovalent hydrocarbon groups, the hydrocarbon mercapto group which may be substituted, the hydrocarbon carbonyl group which may be substituted, and the hydrocarbon oxy carbonyl group which may be substituted are preferable. The monovalent hydrocarbon group which may be substituted, the hydrocarbon oxy group which may be substituted, and the amino group substituted by two not-substituted or substituted monovalent hydrocarbon groups are more preferable. The monovalent hydrocarbon group which may be substituted, and the hydrocarbon oxy group which may be substituted are further more preferable. In these groups, it is preferable that a nitrogen atom bonded with a hydrogen atom is substituted by a monovalent hydrocarbon group. In the general formula (I), when R is bonded to a nitrogen atom in an organic group represented by Ar, R is a monovalent hydrocarbon group which may be substituted, Further, when a group represented by R has plural substituents, two substituents together may be connected to form a ring.

The monovalent hydrocarbon group represented by R includes, for example, approximately 1-50C alkyl groups such as a methyl group, an ethyl group, a propyl group, an isopropyl group, a butyl group, an isobutyl group, a t-butyl group, a pentyl group, a hexyl group, a nonyl group, a dodecyl group, a pentadecyl group, an octadecyl group, a docosyl group, and the like; approximately 3-50C annular saturated hydrocarbon groups such as a cyclopropyl group, a cyclobutyl group, a cyclopentyl group, a cyclohexyl group, a cyclononyl group, a cyclododecyl group, a norbornyl group, an adamantyl group, and the like; approximately 2-50C alkenyl groups such as a ethenyl group, an propenyl group, a 3-butenyl group, a 2-butenyl group, a 2-pentenyl group, a 2-hexenyl group, a 2-nonenyl group, a 2-dodecenyl group, and the like; approximately 6-50C aryl groups such as a phenyl group, a 1-naphthyl group, a 2-naphthyl group, a 2-methylphenyl group, a 3-methylphenyl group, a 4-methylphenyl group, a 4-ethylphenyl group, a 4-propylphenyl group, a 4-isopropylphenyl group, a 4-butylphenyl group, a 4-t-butylphenyl group, a 4-hexylphenyl group, a 4-cyclohexylphenyl group, an adamantylphenyl group, a 4-phenylphenyl group, and the like; and approximately 7-50C aralkyl groups such as a phenylmethyl group, a 1-phenyleneethyl group, a 2-phenylethyl group, a 1-phenyl-1-propyl group, a 1-phenyl-2-propyl group, a 2-phenyl-2-propyl group, a 3-phenyl-1-propyl group, a 4-phenyl-1-butyl group, a 5-phenyl-1-pentyl group, a 6-phenyl-1-hexyl group, and the like.

The aromatic ring is preferably a monocyclic aromatic ring, a condensed-ring aromatic ring, or a polycyclic aromatic ring, more preferably a monocyclic aromatic ring and a condensed-ring aromatic ring, further more preferably a monocyclic aromatic ring, and particular-preferably a benzene ring and a pyrrole ring.

In the general formula (I), when R is bonded to a carbon atom in an organic group represented by Ar, R is independently a monovalent hydrocarbon group which may be sub- The monovalent hydrocarbon group represented by R has preferably the carbon number of 1 to 20, more preferably 2 to 12, and further more preferably 3 to 10. A 3-10C alkyl group is particularly preferable.

A hydrocarbon oxy group, a hydrocarbon mercapto group, a hydrocarbon carbonyl group, a hydrocarbon oxycarbonyl group, and a hydrocarbon sulfonyl group, which are represented by R, are obtained by bonding one monovalent hydrocarbon group to an oxy group, a mercapto group, a carbonyl group, an oxycarbonyl group, and a sulfonyl group.

"An amino group substituted by two not-substituted or substituted monovalent hydrocarbons" and "an aminocarbonyl group substituted by two not-substituted or substituted monovalent hydrocarbons", which are represented by R, are obtained by substituting two hydrogen atoms in an amino group or an aminocarbonyl group (that is, —C(=O)—NH$_2$) with the monovalent hydrocarbon. Particular examples and preferable examples of a monovalent hydrocarbon contained in these groups are the same as the monovalent hydrocarbon group represented by R.

As for a monovalent hydrocarbon group, a hydrocarbon oxy group, a hydrocarbon mercapto group, a hydrocarbon carbonyl group, a hydrocarbon oxycarbonyl group, and a hydrocarbon sulfonyl group, which are represented by R, a part or whole of hydrogen atoms contained in these groups may be substituted by a halogen atom, a hydroxyl group, an amino group, a nitro group, a cyano group, a hydrocarbon oxy group which may be substituted, a hydrocarbon mercapto group which may be substituted, a hydrocarbon carbonyl group which may be substituted, a hydrocarbon oxycarbonyl group which may be substituted, a hydrocarbon sulfonyl group which may be substituted, or the like.

As for R, a monovalent hydrocarbon group, a hydrocarbon oxy group, a hydrocarbon disubstituted amino group, a hydrocarbon mercapto group, a hydrocarbon carbonyl group, a hydrocarbon oxycarbonyl group, a hydrocarbon disubstituted aminocarbonyl group, and a hydrocarbon sulfonyl group, which have 1-20C, are preferable. A monovalent hydrocarbon group, a hydrocarbon oxy group, a hydrocarbon disubstituted amino group, and a hydrocarbon mercapto group, which have 2-12C, are more preferable. A monovalent hydrocarbon group and a hydrocarbon oxy group, which have 3-10C, are further more preferable. A alkyl group and an alkoxy group, which have 3-10C, are particularly preferable.

In the general formula (I), k is an integer of 1 or more, preferably 1 to 4, more preferably 1 to 3, and further preferably 1 or 2.

In the general formula (I), X denotes a halogen atom, a nitro group, or a group represented by —SO$_3$Q (wherein Q denotes a monovalent hydrocarbon group which may be substituted). X is bonded with a carbon atom in an aromatic ring contained in an organic group represented by Ar.

The halogen atoms represented by X are a fluoride atom, a chlorine atom, a bromine atom and an iodine atom, and a chlorine atom, a bromine atom, and an iodine atom are preferable.

The monovalent hydrocarbon groups represented by Q in a group represented by —SO$_3$Q are the same as the particular examples and preferable examples of the monovalent hydrocarbon groups represented by R. The monovalent hydrocarbon group represented by Q may be substituted, and a substituent for this monovalent hydrocarbon group is, for example, a fluorine atom.

Preferable particular examples of a group represented by —SO$_3$Q include a methane sulfonate group, a benzene sulfonate group, a p-toluene sulfonate group, and a trifluoromethane sulfonate group.

X is preferably a halogen atom or a group represented by —SO$_3$Q. A chlorine atom, a bromine atom, an iodine atom, and a group represented by —SO$_3$Q are preferable. A chlorine atom, a bromine atom, an iodine atom, and a trifluoromethane sulfonate group are more preferable. A chlorine atom, a bromine atom, and an iodine atom are particular preferable.

In the general formula (I), Y is an oxygen atom, a sulfur atom, an imino group, a substituted imino group, an ethenylene group, a substituted ethenylene group, or an ethynylene group. An oxygen atom, an imino group, a substituted imino group, and an ethynylene group are preferable. An oxygen atom, an imino group and a substituted imino group are more preferable. An oxygen atom and an imino group are further more preferable. Y is bonded with a carbon atom in an aromatic ring contained in an organic group represented by Ar.

In the general formula (I), n is 0 or 1, and preferably 0.

A substituted imino group represented by Y is a group represented by —N(Q')- (wherein Q' denotes a substituent). The substituent represented by Q' is, for example, a monovalent hydrocarbon group. A particular example of the monovalent hydrocarbon group is the particular examples of the monovalent hydrocarbon group represented by R.

The substituted ethenylene group represented by Y is a group represented by —C(Q")=C(Q''')- (wherein Q" and Q''' denote an hydrogen atom or a substituent which is independent respectively. However, at least one of Q" and Q''' is a substituent). The substituent represented by Q" and Q''' is, for example, a monovalent hydrocarbon group. A particular example of the monovalent hydrocarbon group is the particular examples and preferable examples of the monovalent hydrocarbon group represented by R.

In the general formula (I), M denotes a hydrogen atom, —B(OQ$^1$)$_2$, —Si(Q$^2$)$_3$, —Sn(Q$^3$)$_3$, or —Z$^1$(Z$^2$)m. (wherein Q$^1$ denotes a hydrogen atom or a monovalent hydrocarbon group, two Q$^1$ may be identical with each other or may be different from each other, and two Q$^1$ together may form a ring. Q$^2$ denotes a monovalent hydrocarbon group, three Q$^2$ may be identical with each other or may be different from each other. Q$^3$ denotes a monovalent hydrocarbon group, and three Q$^3$ may be identical with each other or may be different from each other. Z$^1$ denotes a metal atom or a metal ion, Z$^2$ denotes a counter ion, and m is an integer of 0 or more.). In addition, when n is 0, M is bonded with a carbon atom in an aromatic ring contained in an organic group represented by Ar.

Q$^1$ in —B(OQ$^1$)$_2$ denotes a hydrogen atom or a monovalent hydrocarbon group. Two Q$^1$ may be identical with each other or may be different from each other, and two Q$^1$ together may form a ring. The monovalent hydrocarbon group represented by Q$^1$ is the same as the monovalent hydrocarbon group represented by R. However, an alkyl group is preferable, and a methyl group, an ethyl group, a propyl group, an isopropyl group, a butyl group, an isobutyl group, a pentyl group, a hexyl group, and a nonyl group are more preferable. A methyl group, an ethyl group, a propyl group, a butyl group, a pentyl group, and a hexyl group are further more preferable. When two Q$^1$ together form a ring, a hydrocarbon group including the two Q$^1$ (that is, a divalent hydrocarbon group) is preferably a 1,2-ethylene group, a 1,1,2,2-tetramethyl-1,2-ethylene group, 1,3-propylene group, a 2,2-dimethyl-1,3-propylene group, or a 1,2-phenylene group.

Q$^2$ in —Si(Q$^2$)$_3$ denotes a monovalent hydrocarbon group. Three Q$^2$ may be identical with each other or may be different from each other. The monovalent hydrocarbon group represented by Q$^2$ is the same as the monovalent hydrocarbon group represented by R. However, an alkyl, group is preferable and a methyl group, an ethyl group, a propyl group, an isopropyl group, a butyl group, an isobutyl group, a pentyl group, a hexyl group, and a nonyl group are more preferable. A methyl group, an ethyl group, a propyl group, a butyl group, a pentyl group, and a hexyl group are further more preferable.

$Q^3$ in —$Sn(Q^3)_3$ denotes a monovalent hydrocarbon group. Three $Q^3$ may be identical with each other or may be different from each other. The monovalent hydrocarbon group represented by $Q^3$ is the same as the monovalent hydrocarbon group represented by R. However, an alkyl group is preferable and a methyl group, an ethyl group, a propyl group, an isopropyl group, a butyl group, an isobutyl group, a pentyl group, a hexyl group, and a nonyl group are more preferable. A methyl group, an ethyl group, a propyl group, a butyl group, a pentyl group, and a hexyl group are further more preferable.

In —$Z^1(Z^2)_m$, $Z^1$ denotes a metal atom or a metal ion, $Z^2$ denotes a counter ion, and m is an integer of 0 or more. A particular example of a metal or a metal ion represented by $Z^1$ includes, for example, alkali metals such as Li, Na, K, Rb, Cs and the like, alkaline earth metals such as Be, Mg, Ca, Sr, Ba and the like, and atoms or ions such as Al, Ga, In, Tl, Pb, Sc, Ti, V, Cr, Mn, Fe, Co, Ni, Cu, Zn, Y, Zr, Nb, Mo, Ta, Ru, Rh, Ag, Cd, La, Ce, Sm, Eu, Hf, Ta, W, Re, Os, Ir, Pt, Au, Hg and the like. Alkali metals such as Li, Na, K, Rb, Cs and the like, alkaline earth metals such as Be, Mg, Ca, Sr, Ba and the like, and atoms or ions such as Al, Ga, In, Tl, Pb, Sc, Ti, Cu, Zn, Y, Zr, Ag, and Hg are preferable. Atoms or ions such as Li, Na, K, Rb, Cs, Be, Mg, Ca, In, Ti, Pb, Cu, Zn, Zr, Ag, Hg are more preferable. Atoms and ions such as Li, Na, K, Mg, Ca, Cu, and Zn are further more preferable.

$Z^2$ in —$Z^1(Z^2)_m$ denotes a counter ion, and generally denotes an anion. As the counter ion, a conjugate base of Bronsted acid is generally used. A particular example of the counter ion includes a halide ion such as a fluoride ion, a chloride ion, a bromide ion, an iodide ion or the like, a sulfate ion, a nitrate ion, a carbonate ion, a perchlorate ion, a tetrafluoroborate ion, hexafluorophosphate ion, a methansulfonate ion, a trifluoromethansulfonate ion, a toluenesulfonate ion, an acetate ion, a trifluoroacetate ion, a propionate ion, a benzoate ion, a hydroxide ion, an oxide ion, a methoxide ion, an ethoxide ion, and the like. A chloride ion, a bromide ion, an iodide ion, a sulfate ion, a nitrate ion, a carbonate ion, a methansulfonate ion, a trifluoromethansulfonate ion, a toluenesulfonate ion, an acetate ion, a trifluoroacetate ion, a propionate ion, and a benzoate ion are preferable. A chloride ion, a bromide ion, an iodide ion, a methansulfonate ion, a trifluoromethansulfonate ion, a toluenesulfonate ion, an acetate ion, a trifluoroacetate ion, a propionate ion, and a benzoate ion are more preferable. A chloride ion, a bromide ion, an iodide ion, a methansulfonate ion, a trifluoromethansulfonate ion, an acetate ion, and a trifluoroacetate ion are further more preferable. A chloride ion, a bromide ion, and an iodide ion are particularly preferable.

m in —$Z^1(Z^2)_m$ is determined so that the aromatic compound represented by the general formula (I) is to be neutral electrically. In addition, when M is $Z^1(Z^2)_m$, (that is, the aromatic compound represented by the general formula (I) is represented by

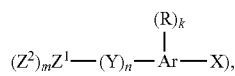

the $Z^1(Z^2)_m$ part is regarded as a +1 valent part, the

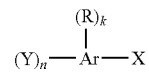

part is regarded as a −1 valent part, and the $Z^1(Z^2)_m$ part and the

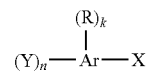

part are regarded to be ionic-bonded. m is preferably an integer of 0 to 3, more preferably an integer of 0 to 2, and further more preferably 0 or 1.

M is preferably —$B(OQ^1)_2$, —$Si(Q^2)_3$, —$Sn(Q^3)_3$, or —$Z^1(Z^2)m$, more preferably —$B(OQ^1)_2$ or —$Z^1(Z^2)m$, further more preferably —$Z^1(Z^2)m$, and particular-preferably —MgCl, —MgBr and —MgI.

Preferable Aromatic Compounds

The aromatic compound represented by the general formula (I) is preferably a compound represented by the following general formula (III).

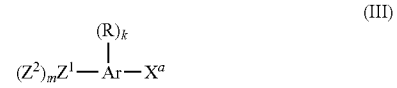

(wherein $Z^1$, $Z^2$, m, Ar, R and k are the same as those described above, and $X^a$ denotes a halogen atom.)

In the general formula (III), the halogen atom represented by $X^a$ is preferably a chlorine atom, a bromine atom, or an iodine atom, more preferably a bromine atom or an iodine atom, and further more preferably an iodine atom. Particular examples and preferable examples of $Z^1$, $Z^2$, m, Ar, R, and k are the same as those described above. However, it is particularly preferable that Ar is an aromatic ring or a monocyclic aromatic ring which contains a carbon atom and a hydrogen atom.

The aromatic compound represented by the general formula (III) is more preferably an aromatic magnesium compound represented by the following general formula (IV)

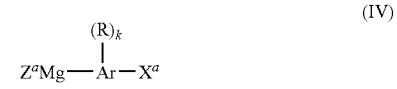

(wherein Ar, R, $X^a$, and k are the same as those described above, and $Z^a$ denotes a halide ion.)

In the general formula (IV), the halide ion represented by $Z^a$ is preferably a chloride ion, a bromide ion, or an iodide ion, more preferably a bromide ion or an iodide ion, and further more preferably a bromide ion. In addition, particular examples and preferable examples of Ar, R, $X^a$ and k are the same as those described above. However, it is particularly preferable that Ar is an aromatic ring or a monocyclic aromatic ring which contains a carbon atom and a hydrogen atom.

The aromatic magnesium compound represented by the general formula (IV) is preferably obtained by reacting a dihalogenated aromatic compound represented by the following general formula (v) with an organic magnesium reagent.

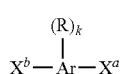

(wherein Ar, R, k and $X^a$ are the same as those described above, and $X^b$ denotes a halogen atom.)

In the general formula (V), $X^b$ is a halogen atom, preferably a chlorine atom, a bromine atom, or an iodine atom, more preferably a bromine atom or an iodine atom, and further more preferably an iodine atom. In addition, particular examples and preferable examples of Ar, R, k and $X^a$ are the same as those described above.

The organic magnesium reagent is, for example, a compound represented by a general formula of R'MgX' (wherein R' denotes a 1-8C alkyl group, a 2-8C vinyl group, or a phenyl group, and X' denotes a chlorine atom, a bromine atom, or an iodine atom). These alkyl group, vinyl group, and phenyl group may be substituted. A particularly preferable organic magnesium reagent is isopropylmagnesiumchloride.

The using amount of the organic magnesium reagent is ordinarily 0.5 to 10 mol with respect to 1 mol of the dihalogenated aromatic compound represented by the general formula (v), preferably 0.9 to 1.1 mol, and more preferably 0.95 to 1.05 mol.

A solvent is ordinarily used to react the dihalogenated aromatic compound represented by the general formula (V) with the organic magnesium reagent. An example of this solvent includes aromatic hydrocarbons such as benzene, toluene, xylene, and the like; chain or annular aliphatic hydrocarbons such as heptane, cyclohexane, and the like; halogenated hydrocarbons such as chlorobenzene, dichlorobenzene, dichloromethane, and the like; nitriles such as acetonitrile, benzonitrile, and the like; ethers such as dioxane, tetrahydrofuran, ethyleneglycoldimethylether, and the like; amides such as N,N-dimethylformamide, N-methylpyrrolidone, and the like; nitro compounds such as nitromethane, nitrobenzene, and the like. Aromatic hydrocarbons and ethers are preferable. The solvent can be used independently or by mixing two or more The using amount of the solvent is ordinarily 0.01 to 10,000 mL with respect to 1 g of the dihalogenated aromatic compound represented by the general formula (V), preferably 0.1 to 1,000 mL, and more preferably 1 to 100 mL.

A temperature to react the dihalogenated aromatic compound represented by the general formula (V) with the organic magnesium reagent is ordinarily −60° C. to 160° C., preferably −40° C. to 120° C., and more preferably −20° C. to 80° C. Further, a reaction time is ordinarily 1 minute to 200 hours, preferably 5 minutes to 96 hours, and more preferably 10 minutes to 48 hours.

Nickel Complex $R^1$ in the general formula (II) denotes a monovalent hydrocarbon group which may be substituted. Four $R^1$ may be identical with each other or may be different from each other, and two $R^1$ together may form a ring.

A particular example of the monovalent hydrocarbon group represented by $R^1$ is the same as that of the monovalent hydrocarbon group represented by R. A 1-20C alkyl group, a 3-20C cycloalkyl group, a 6-20C aryl group, and a 7-20C aralkyl group are preferable. A 1-12C alkyl group, a 3-12C cycloalkyl group, and a 6-12C aryl group are more preferable. A 1-6C alkyl group, a 3-6C cycloalkyl group, and a 3-6C aryl group are further more preferable. An isopropyl group, t-butyl group, a cyclohexyl group, and a phenyl group are particularly preferable. The monovalent hydrocarbon group represented by $R^1$ may be substituted. More particularly, a part or whole of hydrogen atoms in the monovalent hydrocarbon group may be substituted by, for example, a halogen atom, a hydroxyl group, an amino group, a nitro group, a cyano group, the monovalent hydrocarbon group represented by R which may be substituted, a hydrocarbon oxy group which may be substituted, a hydrocarbon mercapto group which may be substituted, a hydrocarbon carbonyl group which may be substituted, a hydrocarbon oxycarbonyl group which may be substituted, a hydrocarbon sulfonyl group which may be substituted, or the like.

The divalent hydrocarbon group represented by $R^2$ which may be substituted ordinarily has the carbon number of 2 to 18, preferably the carbon number of 2 to 12, and more preferably the carbon number of 2 to 6.

The two phosphorous atoms in the general formula (II) are desirably bonded with two or three carbon atoms. When the condition is within this range, an aromatic polymer having a particularly narrow molecular weight distribution can be obtained. That is, the two phosphorous atoms are desirably bonded with a divalent group represented by $—(CR^{}_2)_s—$ (wherein s is 2 or 3, $R^{}$ independently denotes a hydrogen atom or a substituent, or two $R^{**}$ together may form a ring). For example, when a 1,2-ethylene group, a 1,3-propylene group, a 1,2-phenylene group, and a 1,3-phenylene group are described as a example, the number of carbon atoms between the two phosphorous atoms is counted so as to be minimum. For example, the number is counted as the number denoted to the following structural formulas.

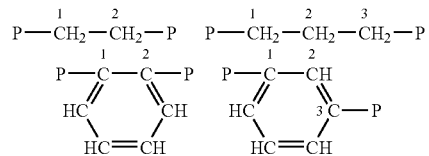

In addition, when $R^2$ has the too long distance between the two phosphorous atoms, e.g., a 1,1'-ferrocenylene group, or when $R^2$ has the two phosphorous atoms continuously bonded with an atom except a carbon atom, an aromatic polymer having a high molecular weight and a narrow molecular weight distribution may not be obtained.

A particular example of the divalent hydrocarbon group represented by $R^2$ which may be substituted includes a 1,2-ethylene group which may be substituted, a 1,3-propylene group which may be substituted, a 1,2-phenylene group which may be substituted, and a 1,3-phenylene group which may be substituted. When the divalent hydrocarbon group represented by $R^2$ is substituted, a part or whole of hydrogen atoms in the divalent hydrocarbon group may be substituted by, for example, a halogen atom, a hydroxyl group, an amino group, a nitro group, a cyano group, the hydrocarbon oxy group which may be substituted, a hydrocarbon mercapto group which may be substituted, a hydrocarbon carbonyl group which may be substituted, a hydrocarbon oxycarbonyl group which may be substituted, a hydrocarbon sulfonyl group which may be substituted, or the like, where these hydrocarbon groups are represented by above described R.

The divalent hydrocarbon group represented by $R^2$ which may be substituted is preferably a 1,2-ethylene group which may be substituted, a 1,3-propylene group which may be substituted or a 1,2-phenylene group which may be substituted. A 1,2-ethylene group, a 1-methyl-1,2-ethylene group, a 1,2-dimethyl-1,2-ethylene group, a 1,1-dimethyl-1,2-ethylene group, a 1,1,2,2-tetramethyl-1,2-ethylene group, a 1,3-propylene group, a 2,2-dimethyl-1,3-propylene group, and a 1,2-phenylene group are more preferable. A 1,2-ethylene group, 1,3-propylene group and a 1,2-phenylene group are further more preferable. A 1,2-ethylene group and a 1,3-propylene group are particularly preferable.

In a production method of the present invention, as for the nickel complex, a complex including a phosphine compound represented by the general formula (II), and a nickel (0) or nickel (II) salt, is used. The nickel complex is preferably a complex including a phosphine compound represented by the general formula (II) and a nickel (II) salt.

The nickel (II) salts include nickel fluoride, nickel chloride, nickel bromide, nickel iodide, nickel nitrate, nickel sulfate, nickel carbonate, nickel phosphorate, nickel acetate, nickel methansulfonate, nickel trifluoromethansulfonate, and nickel toluenesulfonate. Nickel chloride, nickel bromide and nickel iodide are preferable. Nickel chloride and nickel bromide are more preferable and nickel chloride is furthermore preferable.

In the nickel complex used in the production method of the present invention, the mol ratio of the phosphine compound represented by the general formula (II), and the nickel (0) or nickel (II) salt is ordinarily 1:1.

The nickel complex is preferably Ni(dppe)Cl$_2$ [that is, nickel-1,2-bis(diphenylphosphino)ethane-dichloride], or Ni(dppp)Cl$_2$ [that is, nickel-1,3-bis(diphenylphosphino)propane-dichloride].

In the polycondensation in the production method of the present invention, the using amount of the nickel complex is ordinarily 0.0001 to 10 mol with respect to 1 mol of the aromatic compound represented by the general formula (I), preferably 0.001 to 5 mol, and more preferably 0.01 to 5 mol.

It is preferable for the polycondensation in the production method of the present invention to carry out in the presence of a halogenated alkali salt (that is, in the presence of the nickel complex and the halogenated alkali salt). The halogenated alkali salt is preferably lithium chloride, sodium chloride, potassium chloride, lithium bromide, sodium bromide, and potassium bromide. Lithium chloride and lithium bromide are more preferable. Lithium chloride is particularly preferable. The adding amount of the halogenated alkali salt is ordinarily 0.01 to 100 mol with respect to 1 mol of the aromatic compound represented by the general formula (I), preferably 0.1 to 50 mol, and more preferably 0.5 to 10 mol.

In the production method of the present invention, as for the reaction condition at the time of polycondensing the aromatic compound in the presence of the nickel complex, reaction conditions of various aromatic couplings using a nickel catalyst can be used. These reaction conditions are described in Chem. Rev. 102, 1359(2002) and reference documents in it. Particularly, the reaction using the aromatic magnesium compound represented by the general formula (IV) is a typical reaction, and a typical example will be described below.

The polycondensation in the production method of the present invention ordinarily uses a solvent. An example of this solvent includes, for example, aromatic hydrocarbons such as benzene, toluene, xylene, and the like; chain or annular aliphatic hydrocarbons such as heptane, cyclohexane, and the like; halogenated hydrocarbons such as chlorobenzene, dichlorobenzene, dichloromethane and the like; nitriles such as acetonitrile, benzonitrile, and the like; ethers such as dioxane, tetrahydrofuran, ethyleneglycoldimethyl ether, and the like; amides such as N,N-dimethylformamide, N-methylpyrolidone, and the like; nitro compounds such as nitromethane, nitrobenzene, and the like. Aromatic hydrocarbons and ethers are preferable. The solvent can be used independently or by mixing two or more.

When the aromatic compound represented by the general formula (I) (e.g., the aromatic magnesium compound represented by the general formula (IV), or the like) is synthesized by reacting with the organic magnesium reagent, a solvent used for this reaction and a solvent used for the polycondensation may be identical with each other or may be different from each other.

In the polycondensation, the using amount of the solvent is ordinarily 0.01 to 10,000 mL with respect to 1 g of the aromatic compound represented by the general formula (I), preferably 0.1 to 1,000 mL, and more preferably 1 to 100 mL.

A temperature of the polycondensation reaction in the production method is ordinarily −60° C. to 100° C., preferably −50° C. to 60° C., and more preferably −40° C. to 40° C. The reaction time is ordinarily 10 minutes to 1,000 hours, preferably 30 minutes to 500 hours, and more preferably 1 hour to 200 hours.

After finishing the polyconensation reaction, it is preferable that a resulted polymer mixture is washed with a hydrochloride aqueous solution or water, and then the organic solvent is evaporated, or a poor solvent is added so as to precipitate and isolate the aromatic polymer according to its necessity. As for the poor solvent, a solvent in which the aromatic polymer is not dissolved can be used. An example of the poor solvent are chain and annular aliphatic hydrocarbons such as heptane, cyclohexane and the like; alcohols such as methanol, ethanol, n-propylalcohol, iso-propylalcohol, and the like; and water. Methanol is preferable. The using amount of the poor solvent is ordinarily 1 to 1,000 mL with respect to 10 mL of the solvent used for the polycondensation reaction, and preferably 5 mL to 100 mL.

Aromatic Polymer

An aromatic polymer of the present invention as produced by the above-described production method, has a repeating unit represented by the following general formula (VI), and more preferably has a repeating unit represented by the following general formula (VII).

(VI)

(wherein Ar, R, k, and Y are the same as those described above)

(VII)

(wherein Ar, R, and k are the same as those described above)

Particular examples and preferable examples of Ar, R, k, and Y in the general formulas (VI) and (VII) are the same as those of the above-described particular examples and preferable examples.

It is more preferably that the aromatic polymer of the present invention has a repeating unit represented by the following general formula (VIII).

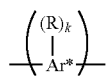

(VIII)

(wherein Ar* denotes a benzene ring or a pyrrole ring, and R, and k are the same as those described above)

Particular examples and preferable examples of R and k in the general formula (VIII) are the same as those described above.

As for the aromatic polymer of the present invention, the minimum number average molecular weight (Mn) in terms of polystyrene is not less than 3,000, more preferably not less than 6,000, and further more preferably not less than 10,000. Further, the maximum number average molecular weight (Mn) is not more than 1,000,000, more preferably not more than 500,000, and further more preferably not more than 100,000.

As for the aromatic polymer of the present invention, a molecular weight distribution (Mw/Mn) defined by a general formula of (a weight average molecular weight in terms of polystyrene)/(a number average molecular weight in terms of polystyrene) is preferably 1.0 to 1.8, more preferably 1.0 to 1.6, further more preferably 1.0 to 1.4, and particular-preferably 1.0 to 1.3.

In the preferred embodiment of the present invention, the aromatic polymer has the number average molecular weight in terms of polystyrene of not less than 10,000, and has the molecular weight distribution of 1.0 to 1.8.

In the preferred embodiment of the present invention, the aromatic polymer has the repeating unit represented by the general formula (VIII), the number average molecular weight in terms of polystyrene of not less than 10,000, and the molecular weight distribution of 1.0 to 1.3. Particularly, the aromatic polymer satisfies the condition that Ar* is a benzene ring in the general formula (VIII).

The aromatic polymers of these preferred embodiments have a particularly narrow molecular weight distribution, and thus have excellent properties to be highly self-integrated and to form a precise layer structure.

The details of the present invention based on examples are described as follow but the present invention is not limited by these examples.

Molecular weights of compounds obtained in the following examples and comparative examples are relative molecular weights with respect to polystyrene (that is, molecular weights in terms of polystyrene) measured by gel permeation chromatography. The number average molecular weight is denoted as "Mn", and the weight average molecular weight is denoted as "Mw". Further, 1,2-bis(diphenylphosphino)ethane will be called shortly as "dppe", 1,3-bis(diphenylphosphino)propane is called shortly as "dppp", and 1,1'-bis(diphenylphosphino)ferrocene is called shortly as "dppf". "Polymer Yield" shown in Table 1 is a theoretical value measured from a value of monomer conversion (an actual measured value).

Example 1

Anhydrous lithium chloride of 0.0424 g (1.00 mmol) was added to a flask under nitrogen flow. The flask was heated and dried under reduced pressure by using a heat gun, substituted by argon, and then cooled to a room temperature. 1,4-dibromo-2,5-dihexyloxybenzene of 0.436 g (1.00 mmol) and naphthalene of 0.0496 g (0.39 mmol) as an internal standard material were added to the flask, and then the flask was re-substituted by argon. Dried THF of 5.0 ml and an isopropylmagnesiumchloride THF solution (2.0 mol/l) of 0.50 ml (1.00 mmol) were added to the flask. Then, the mixture was stirred for 24 hours at a room temperature so as to obtain Grignard 1,4-dibromo-2,5-dihexyloxybenzene (it will be called as "a compound A" or simply called as "A" below). 1.80 mol % Ni(dppp)Cl$_2$ of 0.0095 g (0.018 mmol) suspended with THF of 5.0 ml was added to the compound A, and then the mixture was stirred for 15 hours at a room temperature. After finishing the reaction, 5M hydrochloric acid was added to the mixture and an organic layer was extracted with chloroform. The organic layer was washed with water and then dried with anhydrous magnesium sulfate. After distilling a solvent under a reduced pressure, a faintly-yellow solid was obtained. The obtained solid (compound) was an aromatic polymer having a repeating unit of a 2,5-dihexyloxy-1,4-phenylene structure. These obtained results were shown in Table 1.

Example 2

A compound was synthesized by a similar process to that of Example 1 except that Ni(dppe)Cl$_2$ was used instead of Ni(dppp)Cl$_2$. The obtained compound was an aromatic polymer having a repeating unit of a 2,5-dihexyloxy-1,4-phenylene structure. These obtained results were shown in Table 1.

Comparative Example 1

A compound was synthesized by a similar process to that of Example 1 except that Ni(dppf)Cl$_2$ was used instead of Ni(dppp)Cl$_2$. The compound was an aromatic polymer having a repeating unit of a 2,5-dihexyloxy-1,4-phenylene structure. These obtained results are shown in Table 1. In addition, the results round off 2nd decimal place, and show up to 1st decimal place.

TABLE 1

| | Nickel Complex | Polymer Yield (%) | Number Average Molecular Weight (Mn) | Molecular Weight Distribution (Mw/Mn) |
|---|---|---|---|---|
| Example 1 | Ni(dppp)Cl$_2$ | 94 | 14,600 | 1.3 |
| Example 2 | Ni(dppe)Cl$_2$ | 92 | 12,900 | 1.2 |
| Comparative Example 1 | Ni(dppf)Cl$_2$ | 86 | 3,120 | 2.8 |

Examples 3 to 6

A compound was synthesized by a similar process to that of Example 2 except that the using amount of Ni(dppe)Cl$_2$ was changed from 0.018 mmol to 0.030 mmol (Example 3), 0.014 mmol (Example 4), 0.010 mmol (Example 5), and 0.007 mmol (Example 6). All these compounds were an aromatic polymer having a repeating unit of a 2,5-dihexyloxy-1,4-phenylene structure.

These results are shown in Table 2 with results of Example 2. Further, a graph based on these results is shown in FIG. 1. In this graph, a horizontal axis is "Ratio of Compound A (mol)/Ni(dppe)Cl$_2$ (mol)", a left vertical axis is "Number Average Molecular Weight Mn" (plotted with a lozenge in FIG. 1), and a right vertical axis is "Molecular Weight Distribution Mw/Mn" (plotted with a square in FIG. 1). According to FIG. 1, the number average molecular weight of an aromatic polymer can be controlled by the using amount of a nickel complex.

TABLE 2

| | Compound A (mmol) | Compound A (mmol)/ Ni (dppe)Cl$_2$ (mmol) | Number Average Molecular Weight (Mn) | Molecular Weight Distribution (Mw/Mn) |
|---|---|---|---|---|
| Example 2 | 0.92 | 51 | 12900 | 1.18 |
| Example 3 | 0.99 | 33 | 8150 | 1.20 |
| Example 4 | 0.82 | 59 | 15600 | 1.15 |
| Example 5 | 0.89 | 89 | 24700 | 1.23 |
| Example 6 | 0.75 | 107 | 27900 | 1.25 |

Example 7

A flask was substituted by nitrogen. Then, N-hexyl-2,5-dibromopyrrole of 0.312 g (1.01 mmol), naphthalene of 0.0434 g (0.339 mmol), dppe of 0.0043 g (0.01 mmol), and dried THF of 5 mL were added to the flask. An isopropylmagnesiumchloride THF solution (2M) of 0.48 ml (0.96 mmol) was added to the flask. Then, the mixture was stirred for 24 hours at a room temperature so as to obtain Grignard N-hexyl-2,5-dibromopyrrole (Grignard ratio of 76%). A solution of Ni(dppe)Cl$_2$ of 0.0055 g (0.010 mmol, 1.00 mol %) and dried THF of 5 mL was added to Grignard N-hexyldibromopyrrole, and then the mixture was stirred for 8 hours at a room temperature. After finishing the reaction (Grignard monomer conversion of 93%), 5M hydrochloric acid was added to the mixture so as to be quenched and then an organic layer was extracted with methylene chloride. An organic layer was washed with a saturated sodium hydrogencarbonate aqueous solution and dried with anhydrous sodium sulfate. After distilling a solvent under a reduced pressure, a dark reddish-brown viscosity liquid was obtained. This liquid was an aromatic polymer (Mn=18000, Mw/Mn=1.14) having a repeating unit of a N-hexyl-2,5-pyrrolylen structure.

INDUSTRIAL APPLICABILITY

A production method of the present invention can synthesize an aromatic polymer having a high molecular weight and a narrow molecular weight distribution using a specified aromatic compound and a specified nickel complex. Further, the number average molecular weight of an aromatic polymer can be controlled by adjusting the using amount of a nickel complex. Furthermore, the aromatic polymer produced by the method of the present invention has a remarkably narrow molecular weight distribution, and thus is prospected to have excellent properties to be highly self-integrated and to form a precise layer structure. Therefore, since the aromatic polymer has excellent electric property, optical property, heat resistance, mechanical property, and the like, this aromatic polymer is useful particularly as tip functional materials in a conductive material, a photoelectric conversion material, a light-emitting material, a nonlinear optical material, a material for cell, an electronic part material, a material for automobiles, and the like.

The invention claimed is:

1. A method for producing an aromatic polymer comprising polycondensing an aromatic compound represented by the following general formula (I) in the presence of a nickel complex containing a phosphine compound represented by the following general formula (II) as a ligand,

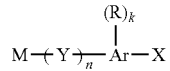

(I)

wherein Ar denotes a divalent organic group having an aromatic ring which may include an oxygen atom and/or a nitrogen atom, R denotes a monovalent hydrocarbon group which may be substituted, a hydrocarbon oxy group which may be substituted, an amino group which is substituted by two not-substituted or substituted monovalent hydrocarbon groups, a hydrocarbon mercapto group which may be substituted, a hydrocarbon carbonyl group which may be substituted, a hydrocarbon oxycarbonyl group which may be substituted, an amino carbonyl group which is substituted by two not-substituted or substituted monovalent hydrocarbon groups, or a hydrocarbon sulfonyl group which may be substituted, k is an integer of 1 or more, when there are plural R, all R may be identical with each other or may be different from each other, and two R together may form a ring, X denotes a halogen atom, a nitro group, or a group represented by —SO$_3$Q (wherein Q denotes a monovalent hydrocarbon group which may be substituted, Y denotes an oxygen atom, a sulfur atom, an imino group, a substituted imino group, an ethenylene group, a substituted ethenylene group, or an ethynylene group, n denotes 0 or 1, M denotes a hydrogen atom, —B(OQ$^1$)$_2$, —Si(Q$^2$)$_3$, —Sn(Q$^3$)3, or —Z$^1$(Z$^2$)$_m$, wherein (Q$^1$ denotes a hydrogen atom or a monovalent hydrocarbon group, two Q$^1$ may be identical with each other or may be different from each other, and two Q1 together may from a ring, Q$^2$ denotes a monovalent hydrocarbon group, and three Q$^2$ may be identical with each other or may be different from each other, Q$^3$ denotes a monovalent hydrocarbon group, and three Q$^3$ may be identical with each other or may be different from each other, Z$^1$ denotes a metal atom or a metal ion, Z$^2$ denotes a counter ion, and m is an integer of 0 or higher,

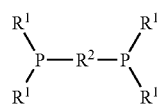

(II)

wherein R$^1$ denotes a monovalent hydrocarbon group which may be substituted, four R$^1$ may be identical with each other or may be different from each other, and two R$^1$ together may form a ring, and R$^2$ denotes a divalent hydrocarbon group which may be substituted.

2. The production method according to claim 1, wherein the aromatic compound represented by the general formula (I) is represented by the following general formula (III),

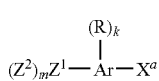

(III)

wherein Z$^1$, Z$^2$, m, Ar, R and k are the same as those described above, and X$^a$ denotes a halogen atom.

3. The production method according to claim 2, wherein the aromatic compound represented by the general formula (III) is represented by the following general formula (IV),

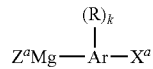

wherein Ar, R, $X^a$ and k are the same as those described above, and $Z^a$ denotes a halide ion.

4. The production method according to claim 1, wherein the polycondensation is carried out in the presence of a halogenated alkali salt.

5. The production method according to claim 1, wherein the two phosphorous atoms are bonded with two or three carbon atoms in the general formula (II).

6. An aromatic polymer produced by a production method of claim 1.

7. The aromatic polymer according to claim 6, wherein the number average molecular weight in terms of polystyrene is not less than 10,000, and wherein a molecular weight distribution specified with the general formula of (the weight average molecular weight in terms of polystyrene)/(the number average molecular weight in terms of polystyrene) is 1.0 to 1.8.

8. An aromatic polymer comprising a repeating unit represented by the following general formula (VIII), wherein the number average molecular weight in terms of polystyrene is not less than 10,000, and wherein a molecular weight distribution specified with the general formula of (the weight average molecular weight in terms of polystyrene)/(the number average molecular weight in terms of polystyrene) is 1.0 to 1.3,

wherein Ar* denotes a benzene ring or pyrrole ring, R denotes a monovalent hydrocarbon group which may be substituted, a hydrocarbon oxy group which may be substituted, an amino group which is substituted by two not-substituted or substituted monovalent hydrocarbon groups, a hydrocarbon mercapto group which may be substituted, a hydrocarbon carbonyl group which may be substituted, a hydrocarbon oxycarbonyl group which may be substituted, an amino carbonyl group which is substituted by two not-substituted or substituted monovalent hydrocarbon groups, or a hydrocarbon sulfonyl group which may be substituted, k is an integer of 1 or higher when there are plural R, they may be identical with each other or may be different from each other, and two R together may form a ring.

* * * * *